United States Patent Office 3,714,963
Patented Feb. 6, 1973

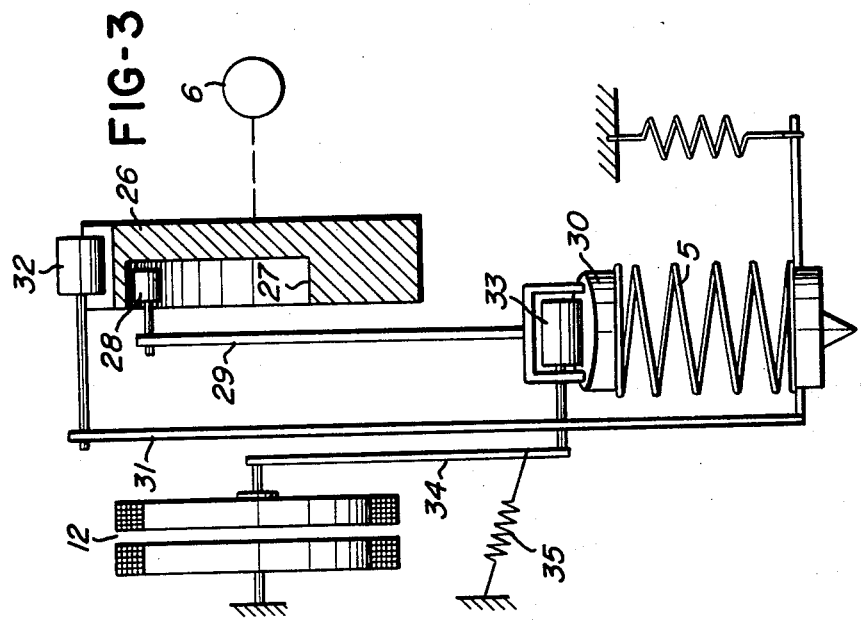
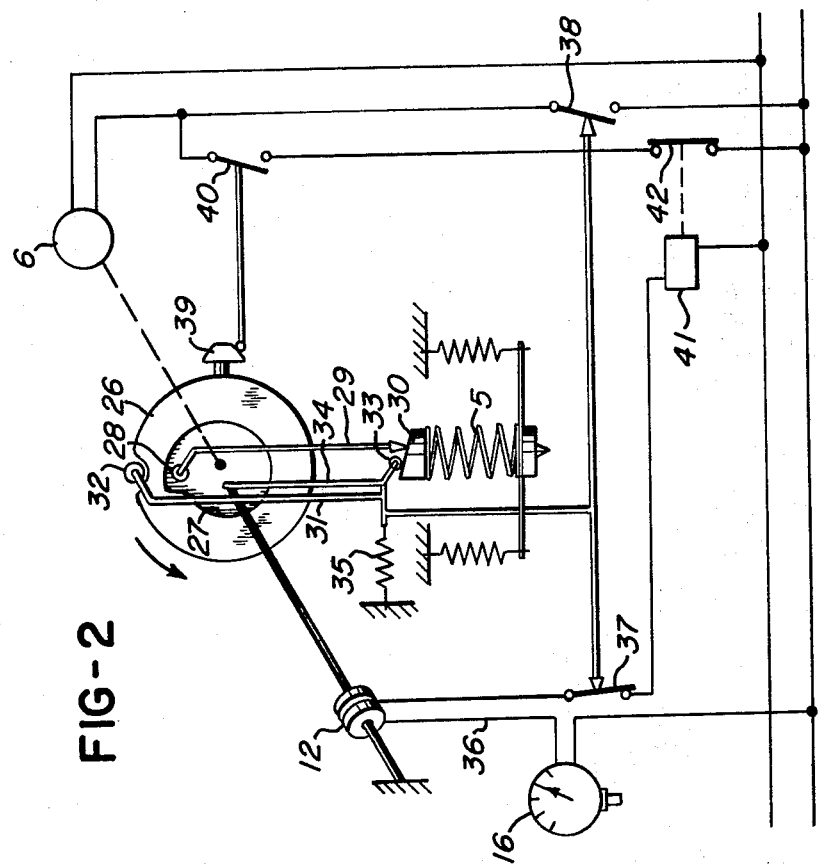

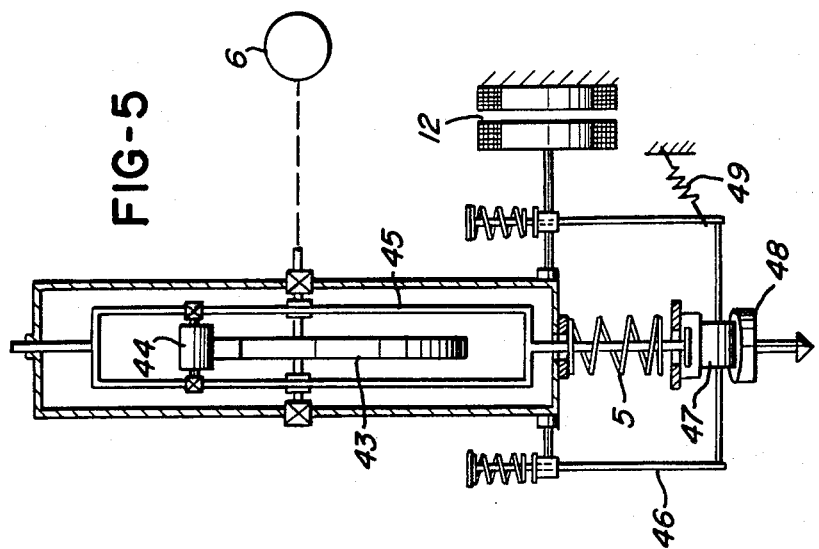
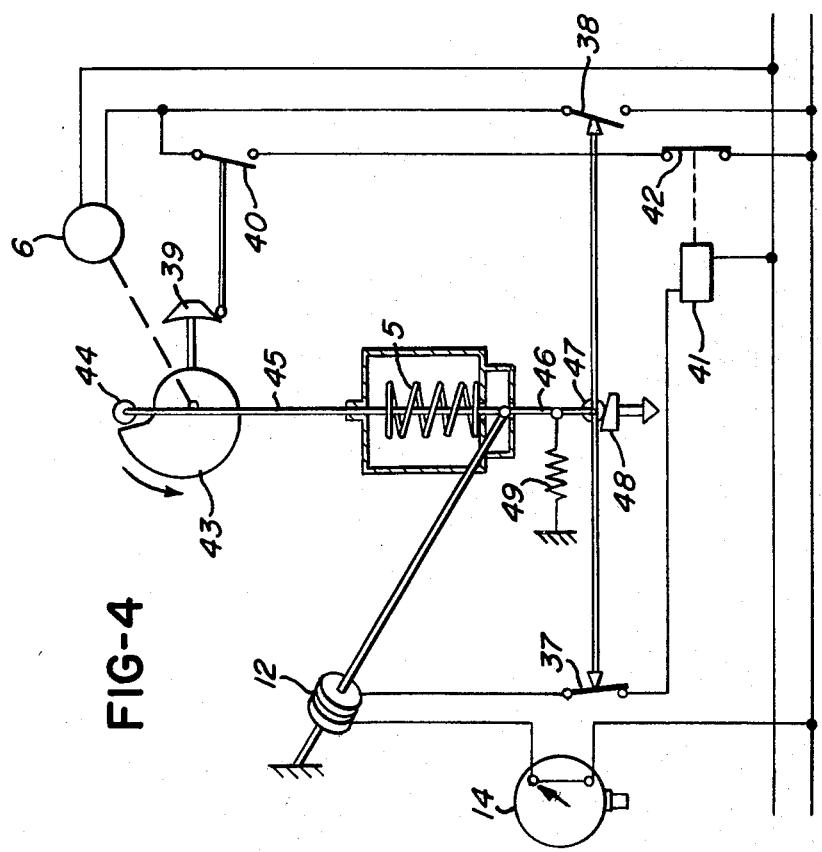

3,714,963
SPRING LOADED SAFETY VALVE
Carl Heinz Hafele, 83 Bergstrasse, 4050
Monchengladbach, Germany
Filed Sept. 13, 1971, Ser. No. 179,980
Claims priority, application Germany, Sept. 14, 1970,
P 20 45 282.8
Int. Cl. F16k 31/00
U.S. Cl. 137—487.5   14 Claims

ABSTRACT OF THE DISCLOSURE

A safety valve in which a valve member is biased toward valve closing position and in which an auxiliary spring is provided for acting on the valve in closing direction. In response to a certain maximum pressure at the valve inlet, the auxiliary spring is suddenly released from the valve member to permit quick opening thereof. The spring is then automatically preloaded without imposing any load on the valve member and thereafter, upon the pressure at the valve inlet reducing to a predetermined minimum pressure, the load of the spring is again imposed on the valve member.

A spring loaded safety valve with controlled additional load has become known according to which the additional load is created by a force of an additional spring which is tensioned by an electromotive drive in combination with a self-locking transmission and in which said force is instantaneously eliminated when the respective responsive pressure has been reached. This instant elimination of the said force is brought about by the fact that by means of a pressure guard or controller the closed circuit of a frictional magnetic clutch is opened whereby the counter bearing for the additional spring seizes.

It is an object of the present invention further to improve the above identified safety valve so that the additional spring will be preloaded immediately after the response of the valve in order to be able in response to the drop of the responsive pressure, to convey the additional load instantaneously onto the valve cone.

This object and other objects and advantages of the invention will appear more clearly from the following specification in connection with the accompanying drawings, in which:

FIG. 2 is a diagrammatic illustration of a modified embodiment of a device according to the invention for tensioning the additional spring.

Figure 1:
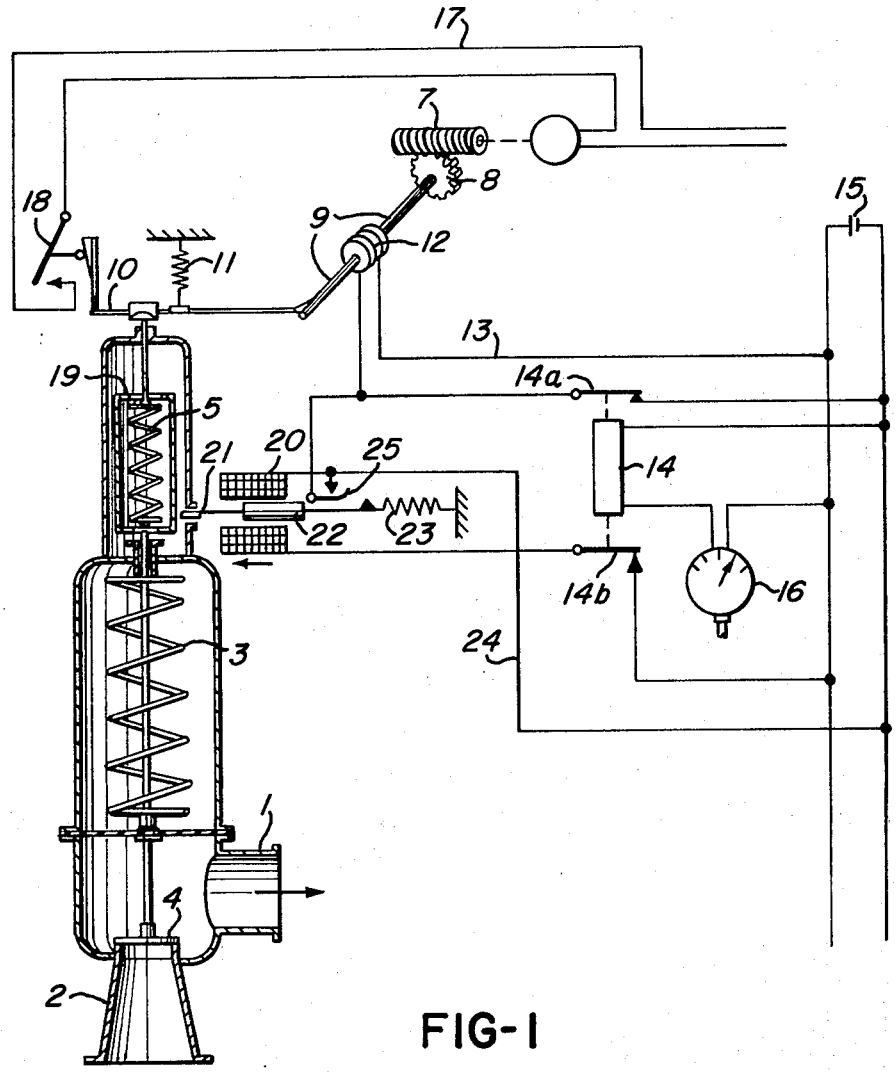
FIG. 1 is a diagrammatic illustration of a safety valve with controlled additional load.

FIG. 3 diagrammatically illustrates the device according to FIG. 2 in a side view.

FIG. 4 is a diagrammatic illustration of an additional embodiment of the invention for tensioning the additional spring.

FIG. 5 diagrammatically illustrates a side view of the device according to FIG. 4.

The spring loaded safety valve according to the present invention, in which the additional load is produced by the force of an additional spring which is tensioned by an electromotive drive in combination with a self-locking transmission and which is instantaneously made ineffective when reaching the responsive pressure of the valve, while said instantaneous effect is obtained by opening a frictional magnetic clutch by means of a pressure guard or controller in the closed circuit so that the counter bearing of the additional spring seizes, is characterized primarily in that the additional spring is, following a relaxation of the supported spring by a support adapted to be engaged and disengaged, is preloaded relative to said support by the immediately turned-on drive, and after the pressure of the additional spring drops below the responsive pressure of the valve becomes instantaneously effective on the valve cone by disengaging said support.

In order to prevent a complete relaxing of the additional spring, it is suggested according to a further development of the invention to provide limiting means for the relaxing of the spring for instance a yoke or housing.

According to a further development of the invention, the said support may be formed by a latch which is adapted to be moved by an electromagnet below the spring disc of the additional spring. The turning on of the electromagnet is, in conformity with a further development of the invention, effected by a relay controlled by the pressure controller and provided with a rest contact located in the circuit of the electromagnet. The relay furthermore comprises a working contact by means of which the circuit for the magnetic clutch is closed as long as the responsive pressure is not exceeded.

According to a further development of the invention, the circuit of the magnetic clutch may additionally be closed by a working contact during the working position of the latch, which working contact is controlled directly or indirectly by the movement of the latch.

According to a modification of the present invention, a cam disc with inwardly located cam path is provided for tensioning the additional spring, said cam disc is connected to the electromotive drive. The said cam path is adapted by means of a push rod having a roller engaging the cam path to act upon the additional spring in such a way that in response to a complete revolution of the cam disc, the spring is tensioned and is subsequently held in tensioned condition by an oscillatable lever in combination with the magnetic clutch engaging said lever. The said lever acts upon an inclined surface of a pressure member of the additional spring, said oscillating lever being movable onto said cam path by means of a roller. As support for the additional spring, there is in this embodiment provided a rod which has its upper end provided with a roller by means of which it rests on the outer surface of the cam disc. In the rest position of the cam disc, the roller is located in a depression. After completion of a tensioning operation, the roller will again stand in front of the depression so that when the tension acting upon the spring drops below the responsive pressure of the valve and the inherent engagement of the drive, the roller will, in response to a further rotation of the cam disc, enter into the depression and will thereby relieve the support.

According to a further embodiment of the invention, for purposes of tensioning the additional spring, there is provided a cam disc which is connected to the drive and has an outwardly located cam path. This cam disc, through the intervention of a pull rod with a roller guided on the cam path, acts upon the additional spring in such a way that in response to a nearly complete revolution of the cam disc, the spring is tensioned and subsequently by a roller mounted on a rocker, which roller moves onto an inclined surface of a pressure member of the additional spring and by means of the magnetic clutch connected to said rocker, is held in tensioned condition.

With this embodiment, the roller on the pull rod will, after completion of the tensioning operation, be located in front of a step of the cam path directed toward the center of the cam disc, in such a way that in response to a drop in the responsive pressure and the inherent continued movement of the cam disc by the drive up to a complete revolution, the roller will be freed by said step and the force of the pretensioned additional spring will be conveyed to the valve cone. The invention furthermore provides that the rocker at its rotational shaft is non-rotatably connected to the magnetic clutch.

Referring now to the drawings in detail, the safety valve illustrated therein primarily comprises a housing 1, a valve cone 2 with the valve spring 3 and the valve seat 4. In the head of the housing 1 there is provided an additional spring 5 which in tensioned condition aids the closing force of the main spring 3. For purposes of tensioning the additional or auxiliary spring 5, there is provided an electric motor 6 which, through the intervention of a worm drive comprising a worm 7 and a worm wheel 8, drives a shaft 9 having connected thereto a tensioning lever 10 acting upon the auxiliary spring 5. The clamping lever 10 is engaged by return spring 11 which has the tendency to keep the tensioning lever in its starting position.

Shaft 9 is sub-divided at one place. Both parts of shaft 9 are adapted to be frictionally connected to each other by means of an electromagnetic clutch 12. The circuit 13 for the clutch 12 is, through a working contact 14a of a relay 14, connected to a current source 15. Relay 14 is by means of a pressure guard or pressure controller 16 controlled in such a way that below the predetermined responsive pressure of the valve, the relay circuit will be closed, whereas when the responsive pressure has been reached, the relay circuit will be opened. The circuit 17 of the electric motor 6 comprises a limit switch 18 which in response to the tensioning position being reached will be opened by the tensioning lever 10. Auxiliary spring 5 is surrounded by a housing 19 which prevents the spring from completely relaxing.

For purposes of creating a temporary supporting during the tensioning of the auxiliary spring 5, there is provided a latch 21 which is movable by means of an electromagnet 20 and which engages the lower spring dish of the auxiliary spring 5 or the lower end of housing 19. The armature 22 of the electromagnet is operatively connected to a return spring 23. Electromagnet 20 is adapted to be energized through the intervention of a rest contact 14b of relay 14.

For purposes of energizing magnetic clutch 12 at the start of a tensioning operation, there is provided a further circuit 24 which comprises a working contact 25 closed when the latch 21 is engaged.

The operation of this embodiment is as follows:

FIG. 1 shows the condition when the valve is closed. The circuit for relay 14 is closed. The two contacts 14a and 14b are closed and open respectively. The working contact 14a keeps the circuit pertaining to the magnetic clutch 12 in closed condition. The circuit of the electromagnet 20 is open, and latch 21 occupies its rest position.

When the responsive pressure of the valve is exceeded, the contact 14a drops off and the circuit 13 is opened, and in view of the frictional connection of the two parts of shaft 9 being interrupted, the counter bearing for the auxiliary spring 5 is eliminated.

In view of the contact 14b having dropped closed, the circuit for the electromagnet 20 is closed. The armature moves the latch 21 into its working position in which it forms a counter bearing for the tensioning of spring 5. When this working position has been reached, contact 25 and thus the second circuit for the magnetic clutch 12 closes. In view of the frictional connection of the two parts of shaft 9, the tensioning lever 10 is pressed downwardly, and the auxiliary spring 5 is tensioned. When reaching the end position, contact 18 opens the circuit 17 for motor 6.

As soon as the pressure drops below the said responsive pressure, the pressure controller 16 brings about the closing of the circuit of relay 14. As a result thereof, contact 14b is attracted and opens the circuit of the electromagnet 20. By retracting latch 21, the support for the auxiliary spring 5 is eliminated so that this spring will instantaneously engage the valve cone. In view of the response of relay 14, additionally working contact 14a is moved to its closing position whereby the first circuit 13 for the magnetic clutch 12 is closed so that said magnetic clutch will remain excited also after the contact 25 has been opened.

According to the embodiments of FIGS. 2 and 3, those parts which correspond to the parts shown and described above in connection with FIG. 1 have been designated with the same reference numerals. For tensioning the auxiliary spring 5, there is in this instance provided a cam disc 26 which is non-rotatably connected to the drive motor 6. Cam disc 26 has an inwardly located cam path 27 engaged by a roller 28 of a pressure rod 29. The pressure rod 29 acts upon a pressure member 30 of the auxiliary spring 5.

The cam disc 26 actuates a rod 31 having its upper end provided with a roller 32 which for the auxiliary spring 5 and during the tensioning operation forms a support or counter bearing.

The pressure member 30 has an inclined surface which is engaged by a roller 33 of a pivotable lever 34 when the auxiliary spring is tensioned. The lever 34 has its rotary shaft connected to the magnetic clutch 12. Furthermore, the lever 34 is engaged by a tension spring 35 which has the tendency to hold the lever 34 in its operative position. The operation of this embodiment is as follows:

When the responsive pressure is exceeded, the pressure controller 16 brings about an opening of a circuit 36 by means of which the clutch 12 is fed. In view of the de-energization of the magnetic clutch 12, the counter bearing for the lever 34 is eliminated and thus the auxiliary spring 5 is freed. The outwardly tilting movement of lever 34 brings about the opening of a rest contact 37 and the closing of a working contact 38. The working contact 38 is located in the circuit of the electric motor 6 which latter is turned on by closing the contact 38 and thus rotates the cam disc 26 by nearly a complete revolution. In view of the rotation of the cam disc, the auxiliary spring 5 is pretensioned by push rod 29 while the lifted rod 31 serves as temporary counter bearing or support. In view of the lever 34 being pivoted inwardly, the working contact 38 is opened again whereby the motor circuit is interrupted. The cam disc 26 occupies a position in which the depression is located on the outer circumference directly in front of roller 32 while a cam 39 maintains the working contact 40 in its closing position. By means of this working contact 40, a second motor circuit is prepared in which additionally there is provided a working contact 42 which is controlled by a relay 41. Relay 41 is excited as soon as the pressing pressure drops. Motor 6 is in this instance placed under voltage by means of contact 42 and brings about a further rotation of the cam disc 26 up to a complete revolution at which roller 32 is located in the depression and thereby the bearing for the preloaded auxiliary spring 5 is freed. Cam 39 frees the working contact 40 which interrupts the circuit for motor 6 so that the latter will stop. The magnetic clutch 12 will when the responsive pressure drops agains likewise be provided with current and thus forms the counter bearing or support for the lever 34.

The embodiment of FIGS. 4 and 5 corresponds to the embodiment of FIGS. 2 and 3 as far as the employment of a cam disc is concerned for tensioning the auxiliary spring 5. Those parts which correspond to each other are again provided with the same reference numerals. The cam disc 43 will in this instance work with an outer cam path on which is guided the roller 44 of a pull rod 45. The thrust of the auxiliary spring 5 is conveyed to the valve cone through the intervention of a pivotable lever 46 with a roller 47. The roller 47 rides on an inclined surface of a pressure member 48. The lever 46 is again engaged by return spring 49. The operation of this device is as follows:

When the responsive pressure drops, the pressure controller 16 opens the rest circuit 36 of the magnetic clutch 12. The lever 46 will be able to pivot toward the side thereby eliminating the additional load. With the pivoting of the lever 46, also rest contact 37 is opened again and the working contact 36 of the motor circuit is closed. Motor 6 starts and turns cam disc 43 by almost a complete revolution. In view of the lifting of the pull rod 45, the auxiliary spring 5 is preloaded and simultaneously the lever 46 is, by the thrust of the tension spring 49, returned to its position of operation. This return movement causes the working contact 38 to open and thereby brings about the turning off of motor 6. Cam disc 43 occupies a position in which the roller 44 will be located in front of the transition to that part of the cam path which is located at a lower level. In this position, a cam 39 keeps working contact 40 closed. As soon as the pressure has dropped again below the responsive pressure, the circuit 36 closes whereby the magnetic clutch 12 and relay 41 are energized. Relay 41 through a working contact 42 closes the second circuit of motor 6 which again advances the cam disc until the cam 39 has freed the working contact 40 again. In view of the further advancing of the cam disc 43, roller 44 and thereby the temporary support or counter bearing of the preloaded auxiliary spring 5 are freed.

As will be seen from the above, the present invention brings about the advantage that the additional spring simultaneously serves as power storage means which is loaded directly following the response to the safety valve, and which instantaneously conveys the stored force to the valve cone when the pressure drops below the responsive pressure.

It is, of course, to be understood that the present invention is, by no means, limited to the particular showing in the drawings but also comprises any modifications within the scope of the appended claims.

What is claimed is:

1. In a spring loaded safety valve: a valve body having a flow passage with an inlet end and an outlet end and a seat between said ends, a valve member biased toward engagement with said seat to close said passage, an auxiliary spring arranged to urge said valve member toward said seat, means responsive to a predetermined maximum pressure at said inlet end of said flow passage for instantaneously releasing said spring from said valve member, means operable automatically for preloading said spring without imposing the load of the spring on the valve member, and means responsive to a predetermined minimum pressure at said inlet end of said flow pasage for operatively connecting said preloaded spring to said valve member.

2. A safety valve according to claim 1 which includes a pressure member at the end of the spring opposite the valve member, an electric motor, an electric clutch connecting the motor to said pressure member effective when energized and operable when effective to actuate the pressure member to load said spring in valve member closing direction, a support at the valve member end of said spring operable when effective to sustain the thrust of the spring and thereby prevent the spring from acting on said valve member, means responsive to a predetermined maximum pressure at the inlet end of said flow passage to make said clutch ineffective to release the load on said spring and thereby release said valve member and to make said support effective, means for making said clutch effective while said support is effective to preload said spring while preventing the spring from acting on said valve member, and means responsive to a predetermined minimum pressure at the inlet end of said flow passage for making said support ineffective position, and an electromagnet energizable to lease said preload spring whereby the spring becomes immediately effective and urges said valve member in closing direction.

3. A safety valve according to claim 2 which includes housing means confining said spring and limiting the degree of relaxation thereof.

4. A safety valve according to claim 2 in which said support comprises a reciprocable plunger urged toward ineffective position, and an electromagnet energizable to move the plunger to effective position.

5. A safety valve according to claim 2 which includes a source of electrical power for said motor and for said electromagnet, a relay operable to open and close in response to said maximum and minimum pressures, and a contact controlled by said relay and in circuit with said electromagnet.

6. A safety valve according to claim 2 in which a further contact under the control of said relay is in circuit with said clutch.

7. A safety valve according to claim 2 which includes a contact in circuit with said clutch and operated by said plunger when the plunger moves to effective spring supporting position.

8. A safety valve according to claim 1 which includes a pressure member at the end of the spring opposite the valve member, an electric motor, a cam driven by said motor and operable in one revolution of said motor to move said pressure member into preload position and then to release said member, an arm pivotal into engagement with said pressure member prior to release of the member by said cam to hold said member in preload position, a clutch energizable to hold said arm in member engaging position and deenergizable to release said arm, a support at the valve member end of said spring operated by said cam into spring supporting position during the major portion of a revolution of said motor, means responsive to a predetermined maximum pressure at the inlet end of said flow passage for deenergizing said clutch and for energizing said motor, means for deenergizing said motor before the motor completes one revolution, means for engaging said clutch after said pressure member has been moved by said cam into preload position, and means responsive to a predetermined minimum pressure in said inlet end of said flow passage for energizing said motor for the completion of a single revolution thereof to release said support from the valve member end of said spring.

9. A safety valve according to claim 8 which includes a shaft connected to said arm and to said clutch, and resilient means biasing said arm toward the effective position.

10. A safety valve according to claim 9 which includes a rod connected to said support, a roller on the rod engaging the outer periphery of said cam, the outer periphery of said cam being cylindrical with a single recess at one point for receiving said roller.

11. A safety valve according to claim 10 in which said motor, when energized by said maximum pressure, rotates until said roller is just ready to drop into said recess and when said motor is energized in response to said minimum pressure it rotates until said roller drops into said recess.

12. A safety valve according to claim 1 which includes a support member at the valve member end of said spring, a cam driven by said motor and operable in one revolution of said motor to move said support member in a direction to compress said spring and then to release said support member, a block connected to the valve member at the spring end thereof having an inclined surface, an arm pivoted to said support member and having a roller engageable with said inclined surface for operatively connecting said support member to said block, an electric clutch energizable to hold said arm in position to cause said roller to engage said surface and deenergizable to release said arm, means responsive to a predetermined maximum pressure at the inlet end of said flow passage to energize said motor and deenergize said clutch, means for deenergizing said motor while said support member is still supported by said cam and for again energizing said clutch, and means responsive to a predetermined minimum pressure at said inlet end of said flow passage to energize said motor to complete one revolution thereof to release said support member from said cam.

13. A safety valve according to claim 12 in which said cam is a spiral cam and said motor when energized by said maximum pressure rotates until said cam is just ahead of the point of releasing said support member, said motor when energized by said minimum pressure rotating just far enough to release said support member.

14. A safety valve according to claim 13 which includes a shaft supporting said arm and connected to said clutch, and a spring biasing said arm toward effective poistion.

References Cited
UNITED STATES PATENTS

| | | | |
|---|---|---|---|
| 1,743,545 | 1/1930 | Helpbringer | 137—487.5 |
| 2,050,430 | 8/1936 | Erickson | 137—487.5 X |
| 3,308,846 | 3/1967 | Yuile | 137—487.5 |

HENRY T. KLINKSIEK, Primary Examiner

R. J. MILLER, Assistant Examiner